United States Patent [19]
Kato

[11] Patent Number: 5,653,520
[45] Date of Patent: Aug. 5, 1997

[54] LIQUID CRYSTAL DISPLAY PROJECTOR

[75] Inventor: Atsushi Kato, Tokyo, Japan

[73] Assignee: NEC Corporation, Japan

[21] Appl. No.: 590,145

[22] Filed: Jan. 23, 1996

[30] Foreign Application Priority Data

Jan. 23, 1995 [JP] Japan ............... 7-007876

[51] Int. Cl.$^6$ ............................................. G03B 21/28
[52] U.S. Cl. .......................... 353/34; 353/33; 353/20; 349/61
[58] Field of Search ..................... 353/20, 31, 33, 353/34, 37; 359/48, 49, 63

[56] References Cited

U.S. PATENT DOCUMENTS

| | | | |
|---|---|---|---|
| 5,124,841 | 6/1992 | Oishi | 359/496 |
| 5,272,496 | 12/1993 | Nicolas et al. | 353/20 |
| 5,283,600 | 2/1994 | Imai . | |
| 5,381,250 | 1/1995 | Meadows | 359/495 |
| 5,381,278 | 1/1995 | Shingaki et al. | 353/20 |
| 5,387,953 | 2/1995 | Minoura et al. | 353/20 |
| 5,387,991 | 2/1995 | Mitsutake et al. | 359/49 |
| 5,446,510 | 8/1995 | Mitsutake et al. | 353/20 |
| 5,452,128 | 9/1995 | Kimura | 353/33 |
| 5,461,500 | 10/1995 | Tsuji et al. | 359/49 |

FOREIGN PATENT DOCUMENTS

| | | | |
|---|---|---|---|
| 3-152523 | 6/1991 | Japan . | |
| 5-241103 | 9/1993 | Japan . | |
| 9110153 | 7/1991 | WIPO | 359/496 |

*Primary Examiner*—William Dowling
*Attorney, Agent, or Firm*—Ostrolenk, Faber, Gerb & Soffen, LLP

[57] ABSTRACT

A liquid crystal display (LCD) projector capable of converting a luminous flux from a light source lamp into a linear polarized beam at high efficiency and providing high-brightness high-uniformity images whose illuminance is uniform all over the projection screen is realized. A luminous flux emitted from a light source lamp 101 comes incident on first through fourth polarization beam-splitter prisms (PBSPs) 104 through 107, and part of the flux is transmitted by the PBSPs as it is and reaches an liquid crystal display (LCD) panel 119 while another part is reflected by the polarization beam-splitting planes of the PBSPs, reflected by first through fourth luminous flux reflecting elements 108 through 111, transmitted by first through fourth ½ retardation plates 113 through 116, and reaches the LCD panel 119. As the latter reinforces the light beams in four peripheral areas of the LCD panel 119, the images projected on the screen through a projection lens, not shown, have high brightness and are uniform in illuminance.

14 Claims, 8 Drawing Sheets

FIG. 11  ILLUMINANCE CHARACTERISTIC OF LUMINOUS FLUX PASSED PBSP (23)
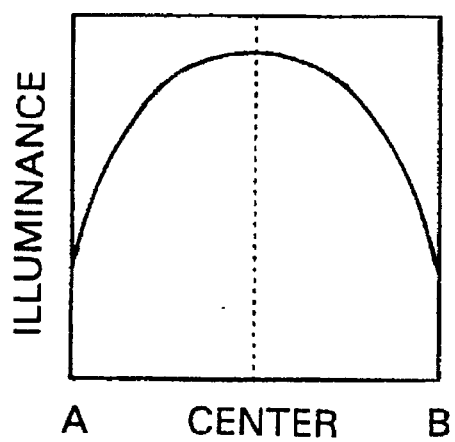
FIG. 12  ILLUMINANCE CHARACTERISTIC OF LUMINOUS FLUX REFLECTED BY PBSP (23)
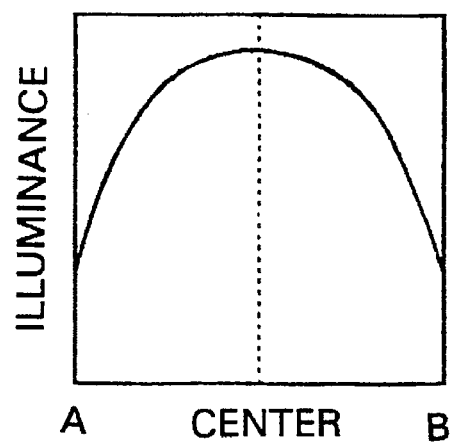

FIG. 13    ILLUMINANCE CHARACTERISTIC AFTER COMBINATION
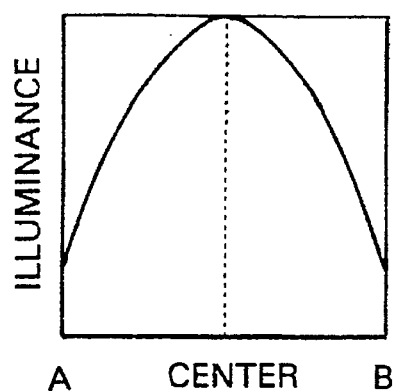
FIG. 14
PRIOR ART
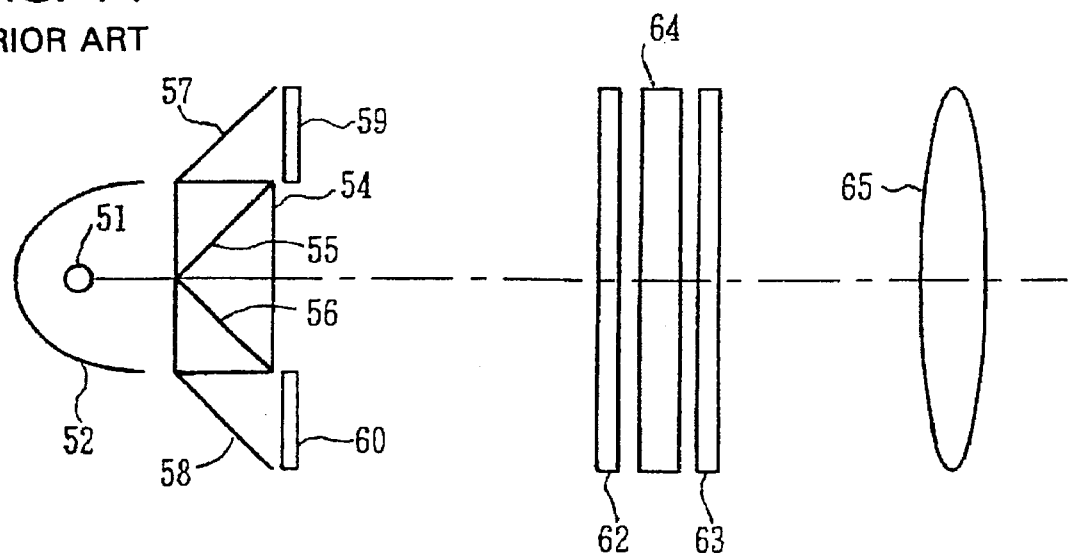
FIG. 15
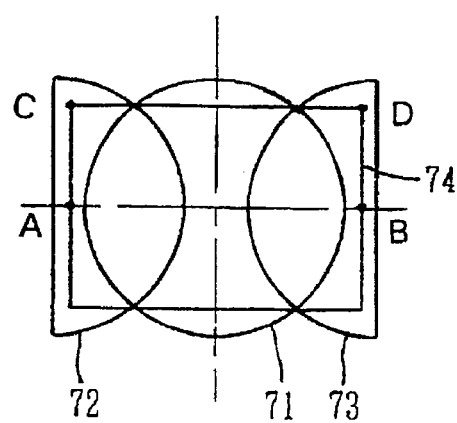

ILLUMINANCE CHARACTERISTIC
AFTER COMBINATION

ILLUMINANCE CHARACTERISTIC

LIQUID CRYSTAL DISPLAY PROJECTOR

BACKGROUND OF THE INVENTION

1. Field of the Invention

The present invention relates to a liquid crystal display (LCD) projector for irradiating an LCD panel with a luminous flux emitted from a light source lamp, by using an polarizing beam-converting optical system, and projecting on a screen or the like images modulated correspondingly to video signals, and more particularly an LCD projector intended to improve the picture quality on the projection screen.

2. Description of the Prior Art

Many proposals have been made to improve the light utilizing efficiency so that LCD projectors for projecting pictures by using a luminous flux emitted from a light source lamp can accomplish projection in a larger frame in a brighter environment.

FIG. 8 illustrates the usual configuration of an LCD projector according to the prior art. This projector has a high-brightness light source lamp 11, such as a metal halide lamp or a xenon lamp. Part of the luminous flux emitted from the light source lamp 11 is reflected by a parabolic reflector 12 to give a substantially parallel luminous flux. The luminous flux directly emitted from the light source lamp 11 or that reflected by the parabolic reflector 12 passes a filter 13, which is intended to remove such harmful components of the luminous flux as heat rays or ultraviolet rays.

The parallel luminous flux, having passed the filter 13 and been cleared of harmful rays, is successively transmitted by a first polarizing plate 13, an LCD panel 15 and a second polarizing plate 16 to come incident on a projection lens 17. Here, the first polarizing plate 14 converts the linear polarized beam coming incident on it into a linear polarized beam correspondingly to video signals. The LCD panel 15 modulates this linear polarized beam correspondingly to the video signals. The second polarizing plate 16 transmits only that component of the modulated linear polarized beam which is in the direction of the axis of transmission. The projection lens 17 enlarges and projects this transmitted linear polarized beam on a screen not shown.

In an LCD projector having such a configuration, out of the luminous flux generated by a light source consisting of the light source lamp 11 and the parabolic reflector 12, only one linear polarized component transmitted by the first polarizing plate 14 is utilized as illuminating light for the LCD panel 15. Thus, the other polarized components orthogonal to this linear polarized component are lost. This results in the disadvantage that the light utilizing efficiency cannot surpass 50% as a matter of principle.

The linear polarized components not utilized as illuminating light are converted into heat by the first and second polarizing plates 14 and 16. As a result, these first and second polarizing plates 14 and 16 are changed in quality by the temperature rise and thereby deteriorated in performance. It is not desirable for this deterioration to adversely affect the quality of projected images. However, if the quantity of light emitted by the light source lamp 11 is increased to make the projected images brighter, the performance characteristics of the first and second polarizing plates 14 and 16 will deteriorate. Moreover, the LCD panel 15 would become more likely to change in performance.

FIG. 9 illustrates another LCD projector proposed to eliminate the disadvantages pointed out above. One such proposal is described in the Gazette of the Japanese Patent Laid-open No. 1991-152523. In the LCD projector shown in this diagram, part of a luminous flux emitted from a light source lamp 21 is reflected by a light source reflector 22, and the substantially parallel luminous flux thereby obtained is brought to incidence on a polarization beam-splitter prism (PBSP) 23.

This PBSP 23 consists of two prisms, the boundary face between which constitutes a polarization beam-splitting plane 24. The p-polarized component of the luminous flux coming incident on the PBSP 23 is transmitted as it is to come incident on a reflective mirror 25. The s-polarized component is reflected by the polarization beam-splitting 24 in a direction at a right angle to the p-polarized component, and comes incident on another reflective mirror 26. The p-polarized and s-polarized components, after being transmitted by their respective retardation plates 27 and 28, are synthesized by being either transmitted by a synthesizing prism 29 consisting of a right-angle prism 29 or reflected by the emitting plane of this transmitted beam, and proceeds toward an LCD panel 31. Here, the retardation plates 27 and 28 are intended to adjust the p-polarized and s-polarized components to have the same axis of polarization as the polarizing plane of the LCD panel 31.

The p-polarized and s-polarized components, after being resynthesized by the synthesizing prism 29, successively pass a condenser lens 32, a first polarizing plate 33, an LCD panel 31 and a second polarizing plate 34, and is brought to incidence on a projection lens 35. The condenser lens 32 is intended to lead the luminous flux efficiently to the projection lens 35. The first polarizing plate 33 converts the linear polarized beam coming incident on it into a linear polarized beam correspondingly to video signals. The LCD panel 31 modulates this linear polarized beam correspondingly to the video signals. The second polarizing plate 34 transmits only that component of the modulated linear polarized beam which is in the direction of the axis of transmission. The projection lens 35 enlarges and projects this transmitted linear polarized beam on a screen not shown.

This LCD projector illustrated in FIG. 9 can unify the p-polarized and s-polarized beams into which the incident luminous flux has been split by the PBSP 23 into either one of the polarized beams and illuminate the LCD panel 31 with it. Therefore, it has the advantage of achieving a higher utilizing efficiency for the light from the light source lamp 21 than that from the light source lamp 11 in the LCD projector shown in FIG. 8.

Incidentally, in the LCD projector shown in FIG. 9, if the effective display area of the LCD panel 31 is to be sufficiently illuminated, the PBSP 23, the luminous flux incident plane 29A and the emitting plane 29B of said luminous flux of the syntheiszing prism 29 will all require a size at least equivalent to the effective display area of the LCD panel 31. Both the PBSP 23 and the synthesizing prism 29 would often be made of glass. Therefore, if these elements are large, they will be inevitably heavy and make it difficult to reduce the weight of the whole projector, which would be a disadvantage.

Furthermore, in order to efficiently utilize the luminous flux over the whole effective display area of the LCD panel 31, it is desirable for the opening area of the light source reflector 22 of the light source lamp 21, like the synthesizing prism 29, to be as large as the effective display area of the LCD panel 31. If this configuration is applied to the LCD projector illustrated in FIG. 9, the luminous flux density will greatly vary between the central and peripheral parts of the projected picture, and it will become impossible to achieve even illuminance over the whole projected picture.

FIGS. 10 and 11 are intended to illustrate this disadvantage. The profile of the illuminating beam, cut normal to the optical axis, upon arrival of the luminous flux generated by the light source lamp 21 and the light source reflector 22, both shown in FIG. 9, at the LCD panel 31, also shown in FIG. 9, is represented by a circle 41 as illustrated in FIG. 10. At this time, the effective display area 42 of the rectangular LCD panel 31 is rectangular, as shown in this FIG. 10.

The illuminating fluxes from the PBSP 23 and the synthesizing prism 29, if similarly cut normal to the optical axis, will have the same cross-sectional shape and illuminance distribution. The illuminance characteristics on the straight line linking horizontal directional points in the central part of the effective display area 42 of the LCD panel 31, represented by A and B as shown in FIG. 10, are such as shown in FIGS. 11 and 12. Here, FIG. 11 illustrates the illuminance characteristic of the luminous flux having passed the PBSP 23 on the LCD panel 31, while FIG. 12 shows the illuminance characteristic of the luminous flux reflected by the PBSP 23 on the LCD panel 31.

In the case of the LCD projector illustrated in FIG. 8, the illumination of the LCD panel 31 is accomplished by a luminous flux resulting from the overlapping of luminous fluxes having the same illuminance distribution as what are shown in these FIGS. 11 and 12. Therefore, the illuminance characteristic in this case is such as shown in FIG. 13, even more ununiform in luminous flux density between the central and peripheral parts.

This is due to the following reason. The luminous flux generated by the light source lamp 21 and the light source reflector 22 has such a general distribution characteristic that its density is greater in the central part and decreases toward the periphery. This invites a similar uneven illuminance distribution on the LCD panel 31 between the central and peripheral parts. Since the illuminance distribution on the projection screen reflects that on the LCD panel 31, the projected picture will eventually have an illuminance difference between its central and peripheral parts and become uneven in brightness.

FIG. 14 illustrates a proposal made in the Japanese Patent Application No. Hei 4(1992)-33821 (Japanese Patent Laid-open No. Hei 5(1993)-241103) and U.S. Pat. No. 5,283,600 to avert this disadvantage. According to this proposal, a substantially parallel variable polarized luminous flux, provided by a light source lamp 51 and a light source reflector 52, is separated into a p-polarized beam and an s-polarized beam, which are a couple of linear polarized beams whose directions of polarization are orthogonal to each other, by the two polarization splitting planes 55 and 56 of a PBSP 54, arranged symmetrically with respect to the optical axis. The s-polarized beam after the splitting undergoes a change in optical path by a total of two matching reflective mirrors 57 and 58 to a direction similar to the path of the p-polarized beam. Here, phase difference plates 59 and 60 arranged correspondingly to these elements performs a phase conversion to change the polarizing direction of the s-polarized beam to the same direction as the p-polarized beam.

The s-polarized beam having passed these phase difference plates 59 and 60 illuminates mainly the peripheral part of an LCD panel 64 arranged between two polarizing plates 62 and 63. The p-polarized beam, which is a luminous flux transmitted by the PBSP 54, illuminates mainly the central part of the LCD panel 64. Therefore, the illumination of the LCD panel 64 is made more uniform with the result that the illuminance distribution on the projection screen, arranged behind the projection lens 35, can be expected to become more even.

FIG. 15 illustrates how the luminous flux would arrive on the LCD panel according to this proposal. A luminous flux 71 transmitted by the PBSP 54 will have a circular cross section, resulting from the addition of semicircular luminous fluxes 72 and 73 reflected by the PBSP 54.

The illuminance characteristic on the straight line linking horizontal directional points in the central part of the effective display area 74 of the LCD panel 64, represented by A and B as in FIG. 10 whereas horizontal positional points in the peripheral boundary part are represented by C and D, is such as shown in FIG. 16. Thus, the illuminance characteristics improves after superposition.

However, this proposal described in the Japanese Patent application No. 1992-33821 involves the problem that uniformity deteriorates toward the periphery even in the central part of the effective display area 74 though the illuminance distribution on the projection screen is relatively uniform as shown in FIG. 16. FIG. 17 illustrates the illuminance characteristic on the straight line linking the horizontal directional points A and B, shown in FIG. 15, revealing an unnatural illuminance characteristic with a lower level in the central part.

SUMMARY OF THE INVENTION

An object of the present invention, therefore, is to provide an LCD projector which can not only convert the luminous flux from the light source lamp into a linear polarized beam at a high efficiency but also provide high-brightness high-uniformity pictures which are uniform in illuminance distribution over the whole area of the projection screen.

Another object of the invention is to provide an LCD projector which can give projected pictures of high quality and permits reductions in the weight and cost of the optical system.

According to a first aspect of the invention, there is provided an LCD projector equipped with: (a) a light source; (b) a plurality of polarization beam-splitter prisms (PBSPs), arranged above and below and to the right and left of the optical axis of a substantially parallel luminous flux emitted from the light source, for splitting the luminous flux into four areas above and below and to the right and left of the center of the flux and bringing to incidence the split beams on the four areas and, at the same time, having their polarization beam-splitting planes reflect part of the incident beam in directions away from the optical axis positioned substantially at the center of the incident luminous flux; (c) polarized beam direction changing means for reflecting substantially in parallel to the optical axis the polarized beams reflected by the polarization beam-splitting planes of the plurality of PBSPs; (d) phase changing means for changing by 90 degrees each of the phases of the polarized beams reflected by the polarization beam-splitting planes of said plurality of PBSPs; and (e) a liquid crystal display (LCD) panel irradiated all over with the luminous flux transmitted by the polarization beam-splitting planes of said plurality of PBSPs and irradiated in its upper, lower, left and right peripheral areas with the luminous flux having passed the polarized beam direction changing means and the phase changing means so as to compensate the illuminance.

Thus, according to this first aspect of the invention, the substantially parallel luminous flux emitted from the light source is brought to incidence on the plurality of PBSPs arranged in four separate areas above and below and to the right and left of the center of the flux, and one component of the luminous flux which is transmitted as it is by these polarization beam-splitting planes and reaches the LCD panel and another component which is reflected by the polarization beam-splitting planes, whose direction of travel is changed by the polarized beam direction changing means toward the LCD panel and at the same time whose phase is changed by the phase changing means by 90 degrees are superposed on the LCD panel. Although the part of the luminous flux which is transmitted as it is by the polarization beam-splitting planes and reaches the LCD panel loses some of its illuminance in the peripheral areas, as this loss of illuminance is compensated for in the upper, lower, right and left areas of the LCD panel by the other part of the luminous flux which is reflected by the polarization beam-splitting planes and reaches the LCD panel, there can be realized a high-brightness LCD projector whose illuminance distribution is uniform.

According to a second aspect of the invention, there is provided an LCD projector equipped with: (a) a light source; (b) a plurality of polarization beam-splitter prisms (PBSPs), arranged above and below and to the right and left of the optical axis of a substantially parallel luminous flux emitted from the light source, for splitting the luminous flux into four areas above and below and to the right and left of the center of the flux and bringing to incidence the split beams on the four areas and, at the same time, having their polarization beam-splitting planes reflect part of the incident beam in directions away from the optical axis positioned substantially at the center of the incident luminous flux; (c) polarized beam direction changing means for reflecting substantially in parallel to the optical axis the polarized beams reflected by the polarization beam-splitting planes of the plurality of PBSPs; (d) phase changing means for changing by 90 degrees each of the phases of the polarized beams transmitted by the polarization beam-splitting planes of said plurality of PBSPs; and (e) an LCD panel irradiated all over with the luminous flux transmitted by the polarization beam-splitting planes of said plurality of PBSPs and further transmitted by the phase changing means, and irradiated in its upper, lower, left and right peripheral areas with the luminous flux having passed the polarized beam direction changing means so as to compensate the illuminance.

Thus, according to this second aspect of the invention, the substantially parallel luminous flux emitted from the light source is brought to incidence on the plurality of PBSPs arranged in four separate areas above and below and to the right and left of the center of the flux, and one component of the luminous flux which is transmitted as it is by these polarization beam-splitting planes and, with its phase being changed by 90 degrees by the phase changing means, reaches the LCD panel and another component which is reflected by the polarization beam-splitting planes and, with its direction of travel changed by the polarized beam direction changing means toward the LCD panel, assimilated to the part of the luminous flux which has been transmitted by the polarization beam-splitting plans and whose phase has been changed by the phase changing means by 90 degrees are super-posed on the LCD panel. Although the part of the luminous flux which is transmitted as it is by the polarization beam-splitting planes and reaches the LCD panel loses some of its illuminance in the peripheral areas, as this loss of illuminance is compensated for in the upper, lower, right and left areas of the LCD panel by the other part of the luminous flux which is reflected by the polarization beam-splitting planes and reaches the LCD panel, there can be realized a high-brightness LCD projector whose illuminance distribution is uniform. The first and second aspects of the invention differ from each other in that the phase changing means is intended for the part of the luminous flux reflected by the polarization beam-splitting planes according to one aspect while the same means is intended for the part of the luminous flux transmitted by the polarization beam-splitting planes according to the other.

According to a third aspect of the invention, the counterparts of said plurality of PBSPs in the LCD projector according to the first or second aspect of the invention are arranged in arrays, their polarization beam-splitting planes being consecutive on the same plane.

Thus, according to this third aspect of the invention, the individual PBSPs constitute arrays each of a plurality of PBSPs whose polarization beam-splitting planes are consecutive on the same plane, so that, while using an optical system which is the same in principle, the optical system is reduced in weight and cost by substantially compressing the volume of the prism part.

According to a fourth aspect of the invention, the counterparts of said plurality of PBSPs in the LCD projector according to the first or second aspect of the invention are first through fourth PBSPs arranged symmetrically above, below and to the right and left of the optical axis.

Thus, according to this fourth aspect of the invention, the luminous flux is divided and brought to incidence on four areas by the first through fourth PBSPs arranged around the optical axis, and the beams transmitted by the polarization beam-splitting planes are led as they are toward the LCD panel while the beams reflected by the polarization beam-splitting planes are led by the polarized beam direction changing means mainly toward the upper, lower, right and left peripheral areas of the LCD panel to compensate for the illuminance drop in the peripheral areas.

According to a fifth aspect of the invention, two of the polarization beam-splitting planes of the first through fourth PBSPs in the LCD projector according to the fourth aspect of the invention form an angle of approximately 45 degrees to the xy plane and the two other polarization beam-splitting planes form an angle of approximately 45 degrees to the yz plane, where the x axis is in the direction of the optical axis and the y and z axis are coordinate axis orthogonal to the x axis.

Thus, according to the fifth aspect of the invention, the ratio between the transmitted light and the reflected light is regulated by arranging the polarization beam-splitting planes at an angle of approximately 45 degrees to either the xy plane or the yz plane.

According to a sixth aspect of the invention, in the LCD projector according to the first, second or third aspect of the invention, first and second PBSPs are arranged before and behind the LCD panel; the first PBSP converts a linear polarized beam coming incident thereon into a linear polarized beam corresponding to video signals, which is modulated by the LCD panel correspondingly to the video signals; and the second PBSP transmits only the component of the modulated linear polarized beam that is in the direction of the transmission axis, and enlarges and projects on a screen the linear polarized beam transmitted by a projection lens arranged behind the second PBSP.

Thus, according to the sixth aspect of the invention, images are formed by the LCD panel and the PBSPs arranged before and behind the LCD panel, and the projection lens enlarges and projects on the screen the images formed thereby.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 11 is a diagram illustrating the illuminance characteristic of a luminous flux transmitted by the PBSPs on the LCD panel in the LCD projector shown in FIG. 9;

FIG. 12 is a diagram illustrating the illuminance characteristic of a luminous flux reflected by the PBSPs on the LCD panel in the LCD projector shown in FIG. 9;

FIG. 13 is a diagram illustrating the illuminance characteristic on the LCD panel in the LCD projector shown in FIG. 8;

FIG. 14 is a schematic configurational diagram of the essential part of an LCD projector proposed in the Gazette of the Japanese Patent Laid-open No. 1992-33821;

FIG. 15 is a diagram for describing how the luminous flux arrives at the LCD panel of the LCD projector according to this proposal;

DETAILED DESCRIPTION OF THE PREFERRED EMBODIMENT

Now the present invention will be described in detail below with reference to a preferred embodiment thereof.

Figure 1:
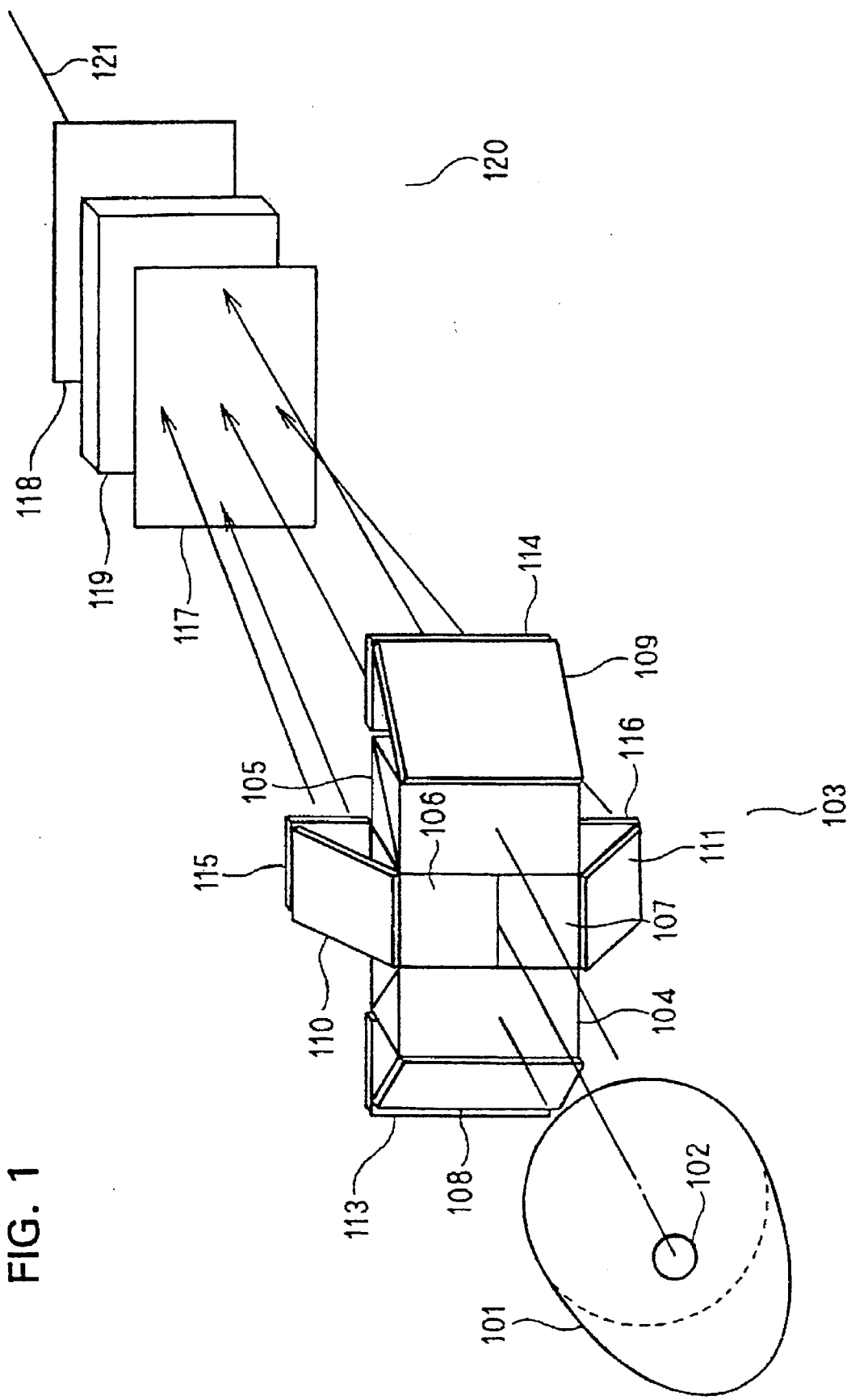
FIG. 1 is a perspective view of the essential parts of an LCD projector, which is a preferred embodiment of the invention.

FIG. 1 illustrates an LCD projector, which is a preferred embodiment of the invention. In this projector, the light source consists of a light source lamp 101 and a light source reflector 102. A high-brightness lamp is used as the light source lamp 101 such as a metal halide lamp, a xenon lamp or a halogen lamp. Luminous flux emitted from the light source lamp 101 is reflected by the reflector 102 which consists of a parabolic surface, and is radiated toward a polarization converting optical system 103 as a substantially parallel variable polarized luminous flux.

The polarization converting optical system 103 of this embodiment consists of four polarization beam-splitter prisms (PBSPs) 104 through 107, luminous flux reflecting elements 108 through 111, and ½ retardation plates 113 through 116. The luminous flux having passed the polarization converting optical system 103 passes an image forming section 120 consisting of first and second polarizers 117 and 118 and an liquid crystal display (LCD) panel 119 sandwiched between them. In this diagram, a straight line 121 represents the optical axis, and behind the second polarizer 118 are arranged a projection lens and a screen (neither shown) so that the projection lens enlarges and projects onto the screen the transmitted linear polarized beam.

Figure 2:
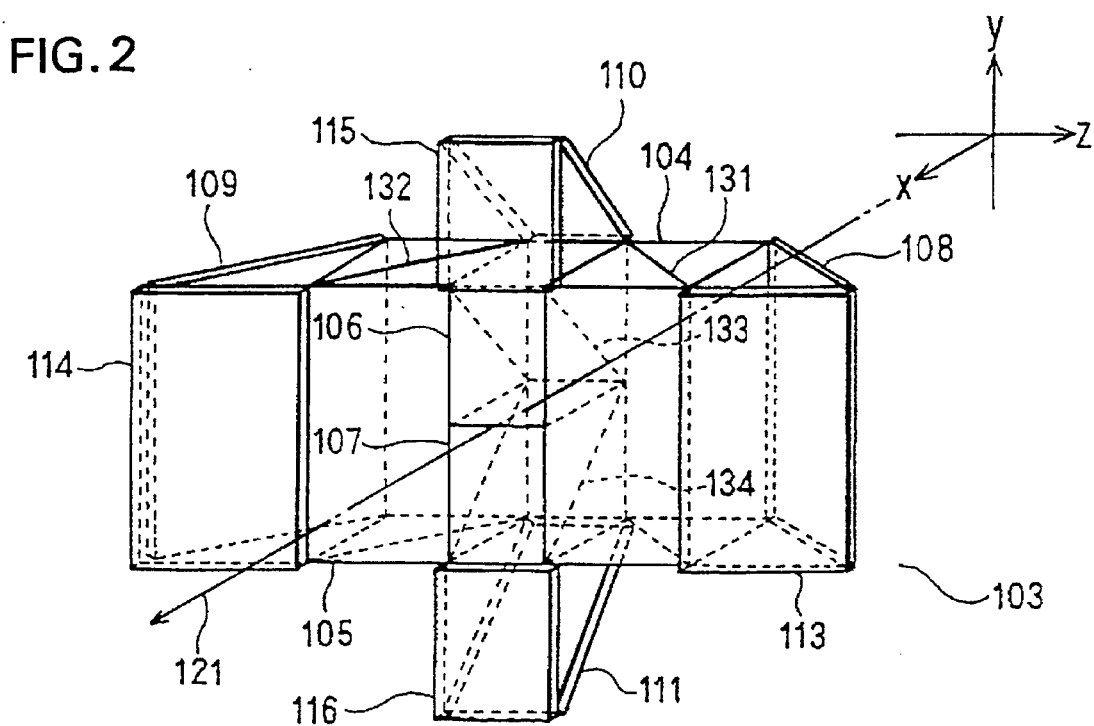
FIG. 2 is a perspective view of the polarization converting optical system of the LCD projector of FIG. 1, seen in an opposite direction to FIG. 1.
Figure 3:
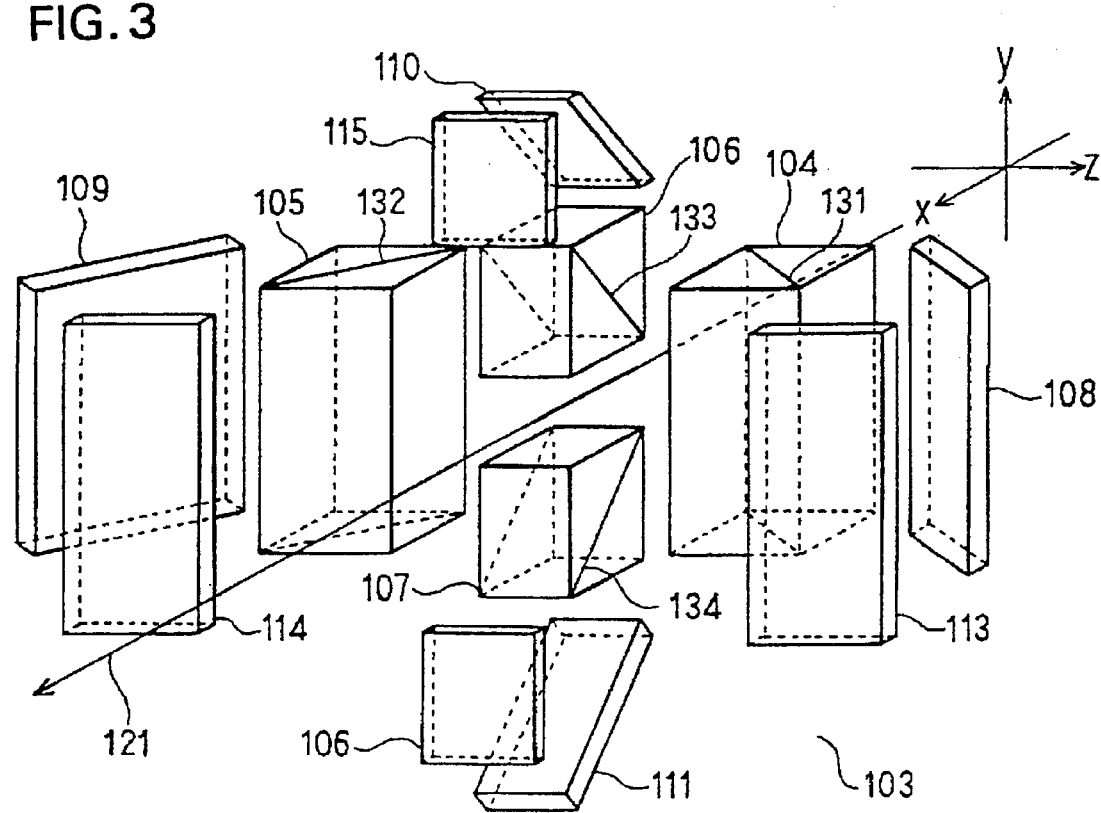
FIG. 3 is an exploded perspective view of the polarization converting optical system of FIG. 2.

FIG. 2 illustrates the polarization converting optical system 103 in an opposite direction to FIG. 1, and FIG. 3 shows it in an exploded view. The polarization converting optical system 103 is provided with the first and second PBSPs 104 and 105 whose respective polarization beam-splitting planes 131 and 132 are symmetric with respect to the optical axis (x axis) 121 and the third and fourth PBSPs 106 and 107 positioned between them in the vertical direction (y axis) in the diagram. The respective polarization beam-splitting planes 133 and 134 of the third and fourth PBSPs 106 and 107 are arranged symmetrically with respect to the y axis. The polarization beam-splitting planes 131 and 132 form an angle of 45 degrees to the xy plane, while the polarization beam-splitting planes 133 and 134 form an angle of 45 degrees to the xz plane.

The first ½ retardation plate 113 is arranged in parallel to the luminous flux emitting plane of the first PBSP 104 in the direction of the z axis on the extension of said plane, while the second ½ retardation plate 114 is arranged in parallel to the luminous flux emitting plane of the second PBSP 105 to be symmetric to the first ½ retardation plate 113 on the extension of said plane. The third ½ retardation plate 115 is arranged in parallel to the luminous flux emitting plane of the third PBSP 106 in the direction of the y axis on the extension of said plane, while the fourth ½ retardation plate 116 is arranged in parallel to the luminous flux emitting plane of the third PBSP 106 to be symmetric to the first ½ retardation plate 113 on the extension of said plane.

The first through fourth ½ retardation plates 113 through 116, arranged in the optical path of the s-polarized component after the change in travel direction of the luminous flux by the first through fourth luminous reflecting elements 108 through 111, change the phase of the s-polarized beam by 90 degrees in the plane vertical to the travel direction of the transmitted light. The s-polarized beam which is transmitted thereby undergoes a phase change to become a p-polarized beam. Unlike in this embodiment, such ½ retardation plates may as well be aligned on the emitting plane of the s-polarized beam.

The first luminous flux reflecting element 108 is arranged to link one edge on the incident side of the first PBSP 104 and one end of the first ½ retardation plate 113, while the second luminous flux reflecting element 109 is arranged to link one edge on the incident side of the second PBSP 105 and one end of the second ½ retardation plate 114. The third luminous flux reflecting element 110 is arranged so as to link one edge on the incident side of the third PBSP 106 and the upper end of the third ½ retardation plate 115, while the fourth luminous flux reflecting element 111 is arranged so as to link one edge on the incident side of the fourth PBSP 107 and the lower end of the fourth ½ retardation plate 116. Preferably, they should be arranged at an angle of no more than 90 degrees to the normals of the polarization beam-splitting planes 131 through 134 of the first through fourth PBSPs, respectively.

In the LCD projector, the luminous flux emitted from the light source lamp 101 is reflected by the parabolically shaped reflector 102, and is incident on the polarization converting optical system 103 as a substantially parallel variable polarized luminous flux. In the polarization converting optical system 103, the first through fourth PBSPs 104 through 107, at their respective polarization beam-splitter planes 131 through 134, transmit the p-polarized component and reflect the s-polarized component of the variable polarized luminous flux from the light source section. The transmitted p-polarized component goes straight on as it is to reach LCD panel 119.

The luminous fluxes of the s-polarized component reflected by the first through fourth PBSPs 104 through 107 are changed in optical path by the first through fourth luminous flux reflecting elements 108 through 111 into substantially the same direction as the optical axis 121, and undergo a 90 degree phase change by the first through fourth ½ retardation plates 113 through 116 to become p-polarized beams. These p-polarized beams are reflected in directions based on the installation angles of the first through fourth luminous flux reflecting elements 108 through 111 to reach the LCD panel 119.

This arrangement unifies the luminous fluxes into p-polarized beams after emission from the polarization conversion optical system 103, and these p-polarized components superpose one another on the LCD panel 119. These superposed luminous fluxes illuminate the LCD panel of the image forming section 120, and images are enlarged and projected onto a screen, not shown, by a projection lens, not shown either.

Figure 4:
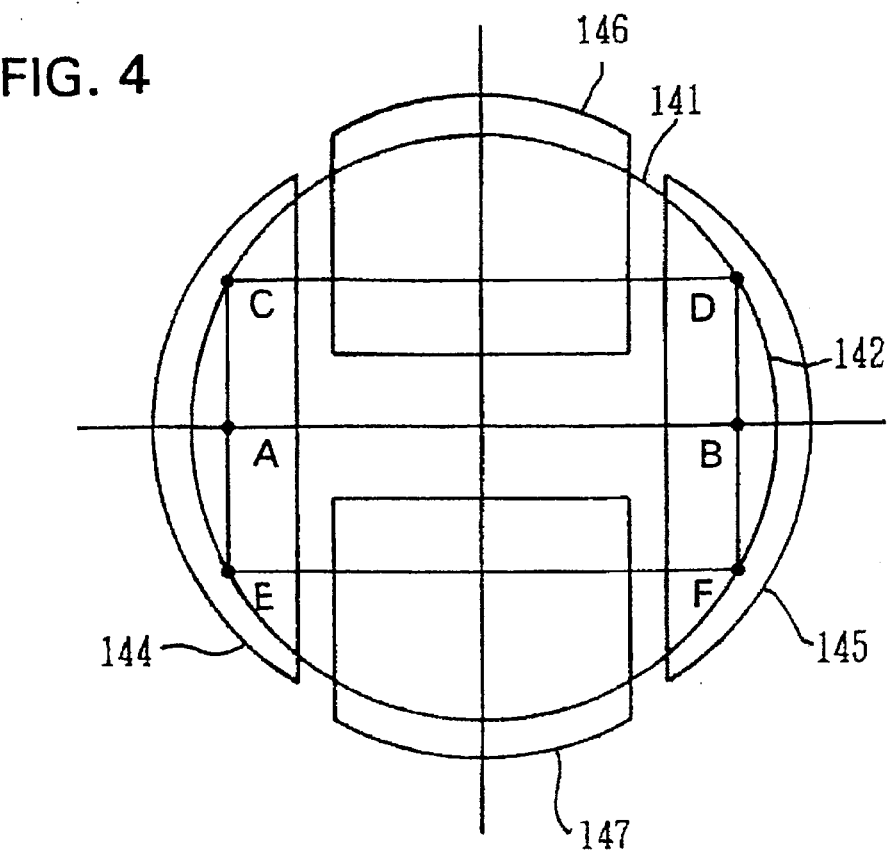
FIG. 4 is a diagram describing how the luminous flux arrives at the LCD panel of the LCD projector.

FIG. 4 shows how the projecting luminous fluxes illuminating the LCD panel superpose one another. In this diagram, the circle represents the p-polarized component 141 having been transmitted by the PBSPs 104 through 107 shown in FIG. 1. A rectangle CDFE inscribed in the circle is the effective display area 142 of the LCD panel 119. The left and right parts of the effective display area 142 are respectively illuminated by p-polarized components 144 and 145 after having undergone reflection by the first and second luminous flux reflecting elements 108 and 109 and phase change by the first and second ½ retardation plates 113 and 114, with the central part being excluded.

The upper and lower parts of the effective display area 142 are respectively illuminated by p-polarized components 146 and 147 after having undergone reflection by the third and fourth luminous flux reflecting elements 110 and 111 and phase change by the third and fourth ½ retardation plates 115 and 116, with the central part being excluded similarly. Every one of these p-polarized components 141 and 144 through 147 manifests a luminous intensity distribution that increases toward the central part of the effective display area 142.

Figure 5:
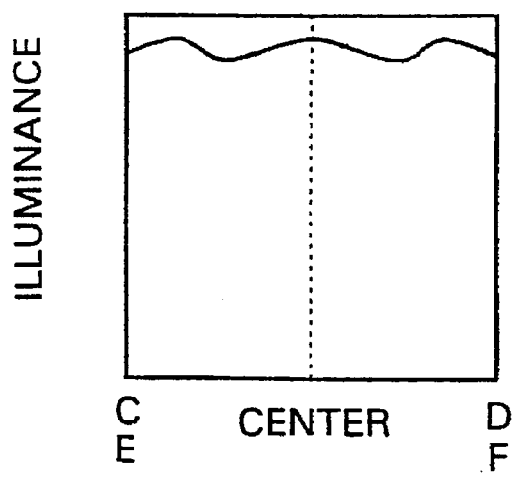
FIG. 5 is a diagram illustrating the illuminance characteristic on a straight line linking horizontal directional points A and B in FIG. 4.
Figure 6:
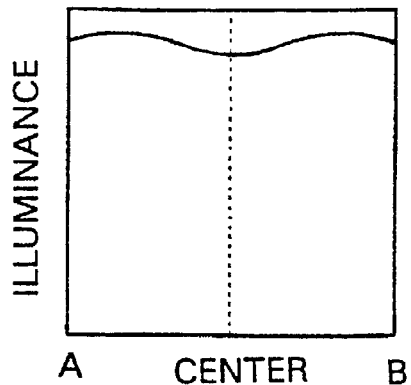
FIG. 6 is a diagram illustrating the illuminance characteristic on a straight line linking horizontal directional points C and D in FIG. 4.
Figure 7:
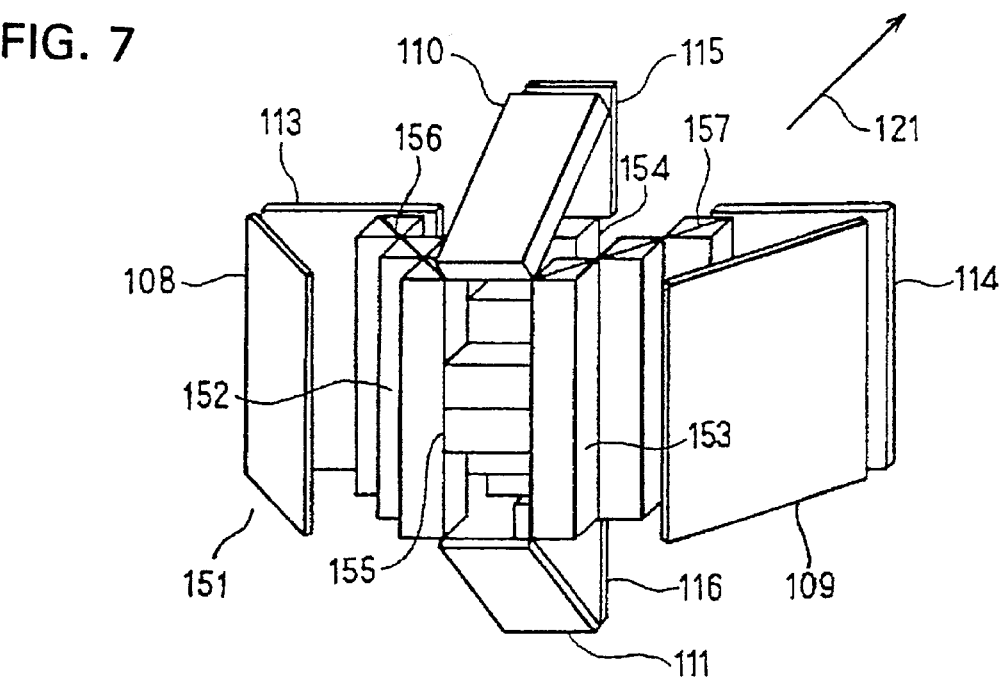
FIG. 7 shows a perspective view of the polarization converting optical system in a variation of the LCD projector of FIG. 1.
Figure 8:
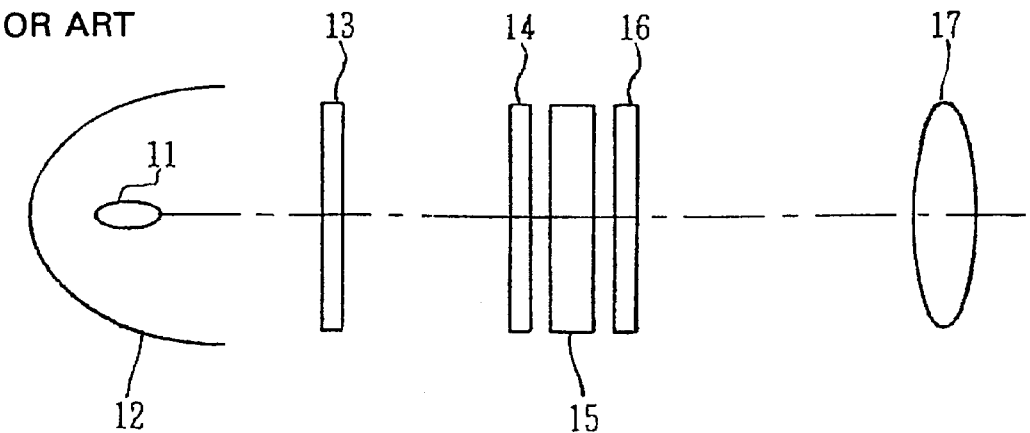
FIG. 8 is a schematic diagram illustrating a general configuration of an LCD projector according to the prior art.
Figure 9:
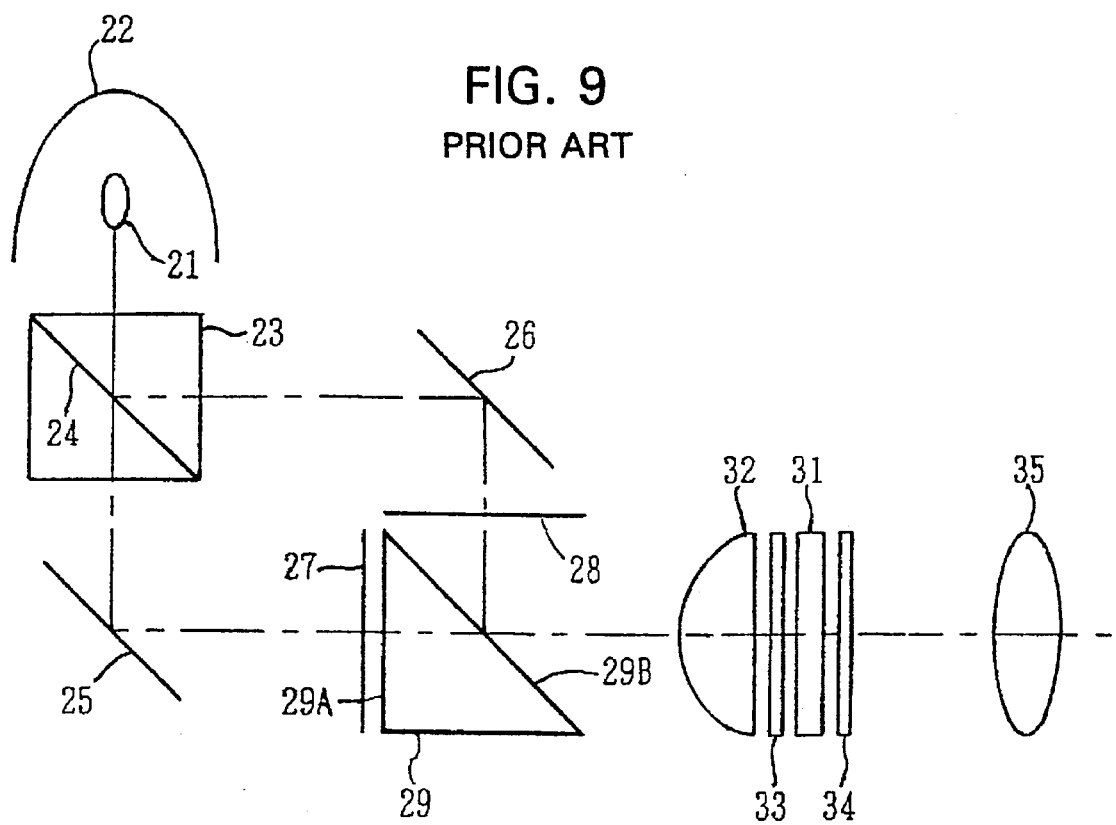
FIG. 9 is a schematic diagram illustrating the configuration of an LCD projector according to a prior proposal, typically disclosed in the Gazette of the Japanese Patent Laid-Open No. 1991-152523.
Figure 10:
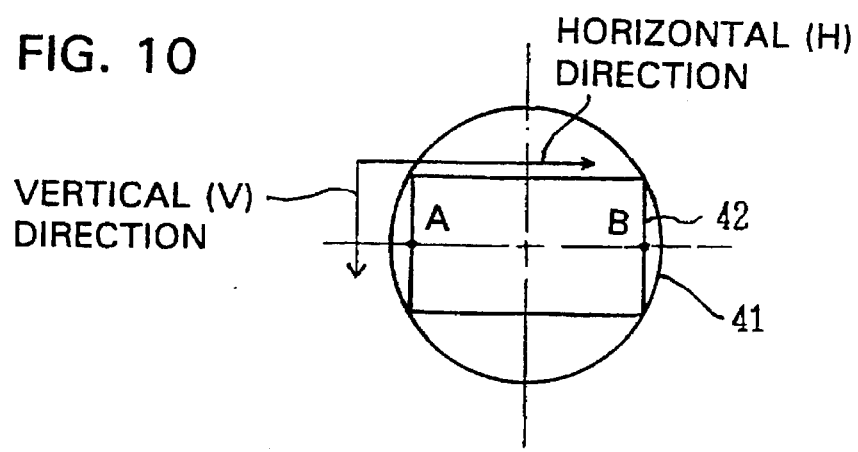
FIG. 10 is a diagram for describing how the luminous flux arrives at the LCD panel of the LCD projector according to the proposal illustrated in FIG. 9.
Figure 16:
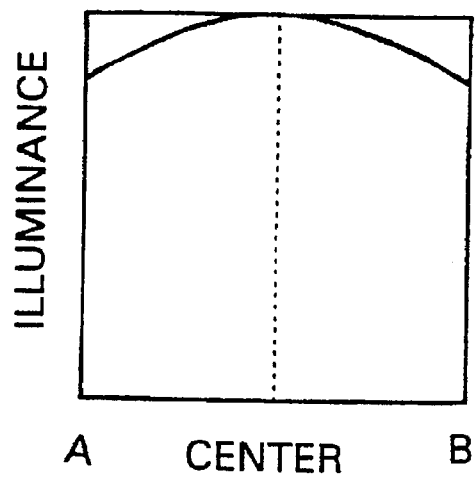
FIG. 16 is a diagram illustrating the illuminance characteristic on a straight line linking horizontal directional points A and B in FIG. 15.
Figure 17:
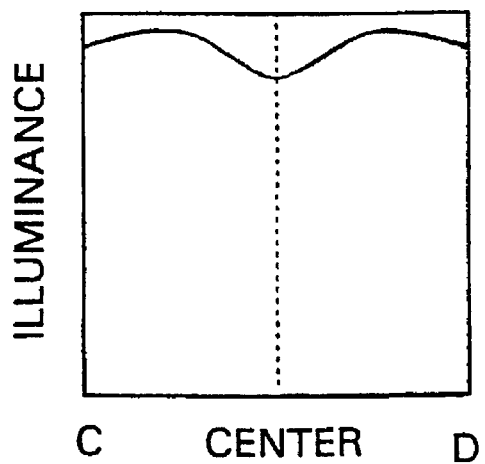
FIG. 17 is a diagram illustrating the illuminance characteristic on a straight line linking horizontal directional points C and D in FIG. 15.

FIG. 5 illustrates the illuminance characteristic on a straight line linking horizontal directional points A and B, where A and B, as in FIG. 10, are horizontal directional points of the central part of the effective display area shown in FIG. 4. FIG. 6 illustrates the illuminance characteristic on a straight line linking horizontal directional points C and D in FIG. 5. Thus, there can be achieved a substantially uniform luminous intensity distribution over the whole effective display area 142 of the LCD panel 119. Variation FIG. 7 illustrates the polarization converting optical system part in an LCD projector which is a variation of the present invention. The same reference signs are given to respectively the same constituent elements. In this variation, a polarization converting optical system 151 has first through fourth PBSP arrays 152 through 155 consisting of the first through PBSPs 104 through 107 in the polarization converting optical system 103 in the basic embodiment, each being split into a plurality of prisms whose polarization beam-splitting planes are formed consecutively. In this diagram, the polarization beam splitting planes 156 and 158 of the first and second PBSP arrays 152 and 153, respectively, are illustrated, but not those of the third and fourth PBSP arrays 154 and 155.

On the edge of the closest one of the PBSPs constituting the first PBSP array 152 to the emitting side in contact with the polarization beam-splitting plane 156 is arranged the first ½ retardation plate 113 in the plane orthogonal to the optical axis 121 in a direction away from the optical axis 121. Similarly, on the edge of the closest one of the PBSPs constituting the second PBSP array 153 to the emitting side in contact with the polarization beam-splitting plane 157 is arranged the second ½ retardation plate 114 in the plane orthogonal to the optical axis 121 in a direction away from the optical axis 121.

Over the third PBSP array 154 is arranged the third ½ retardation plate 115, and underneath the fourth PBSP array 155 is arranged the fourth ½ retardation plate 116. The first through fourth luminous flux reflecting elements 108 through 111 bring the luminous fluxes reflected by the first through fourth PBSP arrays 152 through 155 to incidence on the first through fourth ½ retardation plates 113 through 116, respectively. This arrangement enables the p-polarized luminous fluxes having undergone a 90 degree phase change, together with the p-polarized beams having been transmitted by the first through fourth PBSP arrays 152 through 155 as they are, to reach the LCD panel, not shown, and superpose one another.

Generally, a PBSP has a configuration in which the inclined faces of two right-angled prisms are joined to each other, and a multi-layered dielectric film is formed in that joint part. In the polarization converting optical system 151 of this variation, the prisms are reduced in size and weight by adopting the arrayed structure of the first through fourth PBSP arrays 152 through 155 while keeping the polarization beam-splitting planes the same as in the basic embodiment. This also enables the cost to be reduced. If the PBSPs are divided into a greater number of arrays than in this variation, the ultimate state will be a flat plate type polarization beam splitter, which will have the same effect in principle as the polarization converting optical system 103 in the basic embodiment.

The material for the first through fourth ½ retardation plates 113 through 116 used in the basic embodiment and its variation is not limited to polyvinyl alcohol film, but some other high molecular film such as polycarbonate or polystyrene can as well be used. Furthermore, it would be effective to arrange ½ retardation plates whose optical axis is rotated and in which the wavelength-dependence of double refraction is compensated for.

Nor is the drive system for the LCD panel 119 limited to an active matrix system, but a time-division driven simple matrix system could be used as well. The LCD element can also be a monochrome display element, a color display element with built-in color filters or some other element for time-division color displaying of blue, green and red, to any of which the present invention can be applied.

It is also possible to use an LCD projector according to the invention in a case where the projected light from the light source lamp 101 is divided into three colors, red, green and blue with dichroic mirrors or dichroic prisms, and an LCD panel is arranged on the path of each of the separated beams, which are synthesized on the screen for color displaying.

Furthermore, although reflective mirrors are used as luminous reflecting elements 108 through 111 in the embodiment, prisms can as well be used for the same purpose. While four PBSPs 104 through 107 are used in the embodiment, the number of prisms arranged around the LCD panel 119 to compensate illuminance may be greater. The number of luminous reflecting elements 108 through 111, too, may be greater for even finer compensation of illuminance.

As hitherto described, according to the first and third through sixth aspects of the invention, a substantially parallel luminous flux emitted from a light source is brought to incidence on a plurality of PBSPs arranged in four divided areas, positioned above, below and to the right and left of the center of the flux; polarized beams which are transmitted as they are by the polarization beam-splitting planes of these PBSPs and reach an LCD panel and polarized beams which are reflected by the polarization beam-splitting planes and of which the travel direction is changed toward the LCD panel by polarized beam direction changing means and the phase is changed by 90 degrees by phase changing means are superposed on each other. Therefore, since these polarized beams are unified into in-phase polarized components on the LCD panel, they are superposed so that the illuminance distribution is compensated and, at the same time, high brightness is realized on the panel surface.

According to the second and third through sixth aspects of the invention, a substantially parallel luminous flux emitted from a light source is brought to incidence on a plurality of PBSPs arranged in four divided areas, positioned above, below and to the right and left of the center of the flux; polarized beams which are transmitted by the polarization beam-splitting planes of these PBSPs and, with their phase changed by 90 degrees by phase changing means, reach an LCD panel and polarized beams which are reflected by the polarization beam-splitting planes and whose travel direction is changed toward the LCD panel by polarized beam direction changing means are superposed on each other. Therefore, since these polarized beams are unified into in-phase polarized components on the LCD panel, they are superposed so that the illuminance distribution is compensated and, at the same time, high brightness is realized on the panel surface.

Further according to the third aspect of the invention, the individual PBSPs constitute arrays each of a plurality of PBSPs whose polarization beam-splitting planes are consecutive on the same plane, so that, while using an optical system which is the same in principle, the optical system can be reduced in weight and cost by substantially compressing the volume of the prism part.

Furthermore, although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A liquid crystal display (LCD) projector, comprising:
    a light source;
    a plurality of polarization beam-splitter prisms (PBSPs), arranged above and below and to the right and left of the optical axis positioned substantially at the center of a substantially parallel luminous flux emitted from the light source, for splitting the luminous flux into four areas above and below and to the right and left of the center of the flux and bringing to incidence the split beams on the four areas and having their polarization beam-splitting planes reflect part of the incident beam in directions away from the optical axis;
    polarized beam direction changing means for reflecting the polarized beams reflected by the polarization beam-splitting planes of the plurality of PBSPs to a direction substantially parallel to the optical axis;
    phase changing means for changing each of the phases of the polarized beams reflected by the polarization beam-splitting planes of said plurality of PBSPs by 90 degrees; and
    a liquid crystal display (LCD) panel irradiated in its upper, lower, left and right peripheral areas with the luminous flux having passed the polarized beam direction changing means and the phase changing means and irradiated all over with the luminous flux transmitted by the polarization beam-splitting planes of said plurality of PBSPs.

2. The LCD projector, as claim in claim 1 wherein said plurality of PBSPs are arranged at the same plane substantially perpendicular to the optical axis.

3. An LCD projector, as claimed in claim 1, wherein said plurality of PBSPs are first through fourth PBSPs arranged symmetrically above, below and to the right and left of said optical axis.

4. An projector, as claimed in claim 3, wherein two of the polarization beam-splitting planes of the first through fourth PBSPs form an angle of approximately 45 degrees to the xy plane and the two other polarization beam-splitting planes form an angle of approximately 45 degrees to the yz plane, where the x axis is in the direction of the optical axis and the y and z axis are coordinate axis orthogonal to the x axis.

5. An LCD projector, as claimed in claim 1, wherein first and second polarizers are arranged before and behind said LCD panel; the first polarizer converts a linear polarized beam coming incident thereon into a linear polarized beam corresponding to video signals, which is modulated by the LCD panel correspondingly to the video signals; and the second polarizer transmits only the component of the modulated linear polarized beam that is in the direction of the optical axis, and enlarges and projects on a screen the linear polarized beam transmitted by a projection lens arranged behind the second polarizer.

6. An LCD projector, as claimed in claim 2, wherein first and second polarizers are arranged before and behind said LCD panel; the first polarizer converts a linear polarized beam incident thereon into a linear polarized beam corresponding to video signals, which is modulated by the LCD panel correspondingly to the video signals; and the second polarizer transmits only the component of the modulated linear polarized beam that is in the direction of the optical axis, and enlarges and projects on a screen the linear polarized beam transmitted by a projection lens arranged behind the second polarizer.

7. An liquid crystal display (LCD) projector, comprising:
    a light source;

a plurality of polarization beam-splitter prisms (PBSPs), arranged above and below and to the right and left of the optical axis positioned substantially at the center of a substantially parallel luminous flux emitted from the light source, for splitting the luminous flux into four areas above and below and to the right and left of the center of the flux and bringing to incidence the split beams on the four areas and having their polarization beam-splitting planes reflect part of the incident beam in directions away from the optical axis;

polarized beam direction changing means for reflecting the polarized beams reflected by the polarization beam-splitting planes of the plurality of PBSPs to a direction substantially parallel to the optical axis;

phase changing means for changing each of the phases of the polarized beams transmitted by the polarization beam-splitting planes of said plurality of PBSPs by 90 degrees; and a LCD panel further transmitted by the phase changing means, and irradiated in its upper, lower, left and right peripheral areas with the luminous flux having passed the polarized beam direction changing means and irradiated all over with the luminous flux transmitted by the polarization beam-splitting planes of said plurality of PBSPs and further transmitted by the phase changing means.

8. An LCD projector, as claimed in claim 7, wherein said plurality of PBSPs are arranged at the same plane substantially perpendicular to the optical axis.

9. An LCD projector, as claimed in claim 7, wherein said plurality of PBSPs are first through fourth PBSPs arranged symmetrically above, below and to the right and left of said optical axis.

10. An LCD projector, as claimed in claim 9, two of the polarization beam-splitting planes of the first through fourth PBSPs form an angle of approximately 45 degrees to the xy plane and the two other polarization beam-splitting planes form an angle of approximately 45 degrees to the yz plane, where the x axis is in the direction of the optical axis and the y and z axis are coordinate axis orthogonal to the x axis.

11. An LCD projector, as claimed in claim 7, wherein first and second polarizers are arranged before and behind said LCD panel; the first polarizer converts a linear polarized beam incident thereon into a linear polarized beam corresponding to video signals, which is modulated by the LCD panel correspondingly to the video signals; and the second polarizer transmits only the component of the modulated linear polarized beam that is in the direction of the optical axis, and enlarges and projects on a screen the linear polarized beam transmitted by a projection lens arranged behind the second polarizers.

12. An LCD projector, as claimed in claim 8, wherein first and second polarizers are arranged before and behind said LCD panel; the first polarizer converts a linear polarized beam incident thereon into a linear polarized beam corresponding to video signals, which is modulated by the LCD panel correspondingly to the video signals; and the second polarizer transmits only the component of the modulated linear polarized beam that is in the direction of the optical axis, and enlarges and projects on a screen the linear polarized beam transmitted by a projection lens arranged behind the second polarizer.

13. A liquid crystal display (LCD) projector comprising:

a light source;

a plurality of polarization beam-splitter prisms (PBSPs), arranged above and below and to the right and left of the optical axis positioned substantially at the center of a substantially parallel luminous flux emitted from the light source, for splitting the luminous flux into four areas above and below and to the right and left of the center of the flux and bringing to incidence the split beams on the four areas and having their polarization beam-splitting planes reflect part of the incident beam in directions away from the optical axis;

polarized beam direction changing elements for reflecting the polarized beams reflected by the polarization beam-splitting planes of the plurality of PBSPs to a direction substantially parallel to the optical axis;

phase changing elements for changing each of the phases of the polarized beams reflected by the polarization beam-splitting planes of said plurality of PBSPs by 90 degrees; and a liquid crystal display (LCD) panel irradiated in its upper, lower, left and right peripheral areas with the luminous flux having passed the polarized beam direction changing elements and the phase changing elements and irradiated all over with the luminous flux transmitted by the polarization beam-splitting planes of said plurality of PBSPs.

14. A liquid crystal display (LCD) projector, comprising:

a light source;

a plurality of polarization beam-splitting prisms (PBSPs), arranged above and below and to the right and left of the optical axis positioned substantially at the center of a substantially parallel luminous flux emitted from the light source, for splitting the luminous flux into four areas above and below and to the right and left of the center of the flux and bringing to incidence the split beams on the four areas and having their polarization beam-splitting planes reflect part of the incident beam in directions away from the optical axis;

polarized beam direction changing elements for reflecting the polarized beams reflected by the polarization beam-splitting planes of the plurality of PBSPs to a direction substantially parallel to the optical axis;

phase changing elements for changing each of the phases of the polarized beams transmitted by the polarization beam-splitting planes of said plurality of PBSPs by 90 degrees; and a (LCD) panel irradiated in its upper, lower, left and right peripheral areas with the luminous flux having passed the polarized beam direction changing elements and irradiated all over with the luminous flux transmitted by the polarization beam-splitting planes of said plurality of PBSPs and further transmitted by the phase changing elements.

* * * * *